United States Patent
Van Kesteren et al.

(10) Patent No.: US 6,566,445 B1
(45) Date of Patent: May 20, 2003

(54) FILLER COMPOSITION

(75) Inventors: Peter Van Kesteren, Sassenheim (NL); Marieke Krabbe, Den Haag (NL); Cornelis De Jong, Sassenheim (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/936,631

(22) PCT Filed: Mar. 6, 2000

(86) PCT No.: PCT/EP00/01953

§ 371 (c)(1),
(2), (4) Date: Oct. 29, 2001

(87) PCT Pub. No.: WO00/55233

PCT Pub. Date: Sep. 21, 2000

(30) Foreign Application Priority Data

Mar. 12, 1999 (EP) ............................................ 99200741

(51) Int. Cl.$^7$ .............................. C08J 3/00; C08K 3/20; C08L 75/00; C08F 8/30; C08F 283/04
(52) U.S. Cl. ........................ 524/589; 524/507; 524/590; 525/123; 525/127; 525/128; 525/455
(58) Field of Search ................................. 524/507, 589, 524/590; 525/123, 127, 128, 455

(56) References Cited

U.S. PATENT DOCUMENTS

| | | |
|---|---|---|
| 4,855,342 A | 8/1989 | Becker et al. ................. 524/31 |
| 5,731,382 A | 3/1998 | Bederke et al. .............. 525/123 |

FOREIGN PATENT DOCUMENTS

| | | | |
|---|---|---|---|
| DE | 35 46 594 A1 | 12/1987 | .......... C08F/212/06 |
| EP | 0 630 923 A2 | 12/1994 | .......... C08G/18/62 |
| EP | 0 760 387 A1 | 3/1997 | .......... C09B/57/10 |
| GB | 2 186 281 A | 12/1987 | .......... C08L/33/00 |

OTHER PUBLICATIONS

International Search Report Dated: Nov. 28, 2001.
Chemical Abstract No.: XP–002111122 of Japanese Patent No.: JP 62 95,354.

*Primary Examiner*—Patrick D. Niland
(74) *Attorney, Agent, or Firm*—Joan M. McGillycuddy

(57) ABSTRACT

The present invention relates to a filler composition comprising A) at least one hydroxy group-containing polyacrylate comprising 40–70 wt. % aromatic vinyl monomers and/or methyl methacrylate, 25–40 wt. % hydroxy-functional (meth)acrylic monomers, 0-20 wt. % (meth)acrylic monomers having at least 2 carbon atoms in the alkyl group, and 0.5-2.5 wt. % (meth)acrylic acid, wherein the hydroxy group-containing polyacrylate has a hydroxy value of between 100 and 160 mg KOH/g solid resin, an acid value between 5 and 20 mg KOH/g solid resin, a Mw higher than 15,000 and a Tg between 25 and 100° C., B) at least one polyisocyanate compound, and C) at least one pigment, the filler composition having a pigment volume concentration ranging from 40 to 80 % on solids. The filler composition of the present invention may be used for sanding and non-sanding applications, cured with a large variety of polyisocyanates, and covered with conventional top coats. The filler may be used within a broad temperature and humidity range. Its properties are equal to those of commercial fillers or an improvement thereon.

18 Claims, No Drawings

FILLER COMPOSITION

This application is the national phase of International Patent Application No. PCT/EP00/01953, filed on Mar. 6, 2000, and which claims priority of European Patent Application No. 99200741.9, filed Mar. 12, 1999.

BACKGROUND OF THE INVENTION

The present invention relates to a filler composition comprising a hydroxy group-containing polyacrylate, a polyisocyanate, and a pigment.

Filler compositions are known from DE-A-35 46 594 and GB 2 186 281. Both publications disclose filler compositions which comprise hydroxy group-containing polyacrylates and polyisocyanates. These filler compositions are too soft when cured, resulting in a moderate sandability.

SUMMARY OF THE INVENTION

The present invention now provides a filler composition comprising
A) at least one hydroxy group-containing polyacrylate comprising
40–70 wt. % aromatic vinyl monomers and/or methyl methacrylate,
25–40 wt. % hydroxy-functional (meth)acrylic monomers,
0–20 wt. % (meth)acrylic monomers having at least 2 carbon atoms in the alkyl group, and
0.5–2.5 wt. % (meth)acrylic acid,
wherein the hydroxy group-containing polyacrylate has a hydroxy value of between 100 and 160 mg KOH/g solid resin, an acid value between 5 and 20 mg KOH/g solid resin, a Mw higher than 15,000, and a Tg between 25 and 100° C.,
B) at least one polyisocyanate compound, and
C) at least one pigment,
the filler composition having a pigment volume concentration ranging from 40 to 80% on solids.

DETAILED DESCRIPTION OF THE INVENTION

The present invention provides a filler composition with excellent balance between pot life and drying/sandability properties, build versus drying time, and viscosity and flow. The filler may be used for sanding and non-sanding applications, cured with a large variety of polyisocyanates, and covered with conventional top coats. The filler may be used within a broad temperature and humidity range. Properties such as sandability, adhesion to substrate and top coat, pot life, corrosion resistance, water resistance, enamel hold out, hardness, and in-can stability are equal to those of commercial fillers or improvements thereon.

The hydroxy group-containing polyacrylate may be prepared from aromatic vinyl compounds, methyl methacrylate, hydroxy-functional (meth)acrylic monomers, (meth)acrylic monomers having at least 2 carbon atoms in the alkyl group, and (meth)acrylic acid. Examples of aromatic vinyl compounds include styrene and its derivatives, such as vinyl toluene and mixtures thereof. Hydroxy-functional (meth)acrylic monomers preferably have 2 to 4 carbon atoms in the alkyl component. Examples of hydroxy-functional (meth)acrylic monomers include hydroxy ethyl (meth)acrylate, hydroxy propyl (meth)acrylate, hydroxy butyl (meth)acrylate, and mixtures thereof. (Meth)acrylic monomers preferably have 2 to 6 carbon atoms in the alkyl component. Examples of (meth)acrylic monomers include ethyl (meth)acrylate, propyl (meth)acrylate, butyl (meth)acrylate and mixtures thereof. The terms (meth)acrylate and (meth)acrylic acid refer to methacrylate and acrylate as well as methacrylic acid and acrylic acid, respectively. The hydroxy group-containing polyacrylate is prepared by conventional methods, for instance, by the slow addition of appropriate monomers to a solution of an appropriate polymerisation initiator, such as an azo or peroxy initiator.

Preferably, the hydroxy group-containing polyacrylate comprises:
47–53 wt. % aromatic vinyl monomers, such as styrene, and/or methyl methacrylate,
28–33 wt. % hydroxy-functional (meth)acrylic monomers, such as hydroxy ethyl (meth)acrylate,
14–19 wt. % (meth)acrylic monomers having at least 2 carbon atoms in the alkyl group, such as butyl acrylate, and
0.5–2 wt. % (meth)acrylic acid.

The hydroxy group-containing polyacrylate has a hydroxy value of between 100 and 160 mg KOH/g solid resin, preferably between 110 and 130 mg KOH/g solid resin. The acid value of the hydroxy group-containing polyacrylate is between 5 and 20 mg KOH/g solid resin. The weight average molecular weight (Mw) of the polymer is higher than 15,000, as measured by gel permeation chromatography with polystyrene as standard, preferably between 15,000 and 30,000. The glass transition temperature (Tg) is between 25 and 100° C., preferably 40 to 60° C., calculated from the glass transition temperatures of the homopolymer of the individual monomers quoted in the literature (Fox equation, see, e.g., Batzer, *Polymeric Material*, 1935, p. 307).

The polyisocyanate compound is a cross-linker which reacts with hydroxy groups. Polyisocyanates are compounds with two or more isocyanate groups per molecule, and are well-known in the filler art. Suitable polyisocyanates are aliphatic polyisocyanates such as trimethylene diisocyanate, 1,2-propylene diisocyanate, tetramethylene diisocyanate, 2,3-butylene diisocyanate, hexamethylene diisocyanate, octamethylene diisocyanate, 4-isocyanatomethyl-1,8-octane diisocyanate, 2,2,4-trimethyl hexamethylene diisocyanate, 2,4,4-trimethyl hexamethylene diisocyanate, dodecamethylene diisocyanate, α,α'-dipropyl ether diisocyanate, and transvinylidene diisocyanate; alicyclic polyisocyanates, such as 1,3-cyclopentylene diisocyanate, 1,2-cyclohexylene diisocyanate, 1,4-cyclohexylene diisocyanate, 4-methyl-1,3-cyclohexylene diisocyanate, 4,4'-dicyclohexylene diisocyanate methane, 3,3'-dimethyl-4,4'-dicyclohexylene diisocyanate methane, norbornane diisocyanate, and isophorone diisocyanate; aromatic polyisocyanates such as m- and p-phenylene diisocyanate, 1,3- and 1,4-bis(isocyanate methyl) benzene, 1,5-dimethyl-2,4-bis(isocyanate methyl) benzene, 1,3,5-triisocyanate benzene, 2,4- and 2,6-toluene diisocyanate, 2,4,6-toluene triisocyanate, (α,α,α',α'-tetramethyl o-, m-, and p-xylylene diisocyanate, 4,4'-diphenylene diisocyanate methane, 4,4'-diphenylene diisocyanate, 3,3'-dichloro-4,4'-diphenylene diisocyanate, and naphthalene-1,5-diisocyanate; and mixtures of the aforementioned polyisocyanates.

Also, such compounds may be adducts of polyisocyanates, e.g., biurets, isocyanurates, allophanates, uretdiones, prepolymers of polyisocyanates, and mixtures thereof. Examples of such adducts are the adduct of two molecules of hexamethylene diisocyanate or isophorone diisocyanate to a diol such as ethylene glycol, the adduct of 3 molecules of hexamethylene diisocyanate to 1 molecule of water, the adduct of 1 molecule of trimethylol propane to 3 molecules of isophorone diisocyanate, the reaction product of 3 moles of m-α,α,α',α'-tetramethylxylene diisocyanate with 1 mole of trimethylol propane, the adduct of 1 molecule of pentaerythritol to 4 molecules of toluene diisocyanate, the isocyanurate of hexamethylene diisocyanate, available from Bayer under the trade designation Desmodur® N3390 and Desmodur® N3600, the uretdione of hexamethylene diisocyanate, available from Bayer under the trade designation Desmodur® N3400, the allophanate of hexamethylene diisocyanate, available from Bayer under the trade designation Desmodur® LS 2101, the adduct of 3 moles of toluene diisocyanate to 1 mole of trimethylol propane, available from Bayer under the trade designation Desmodur® L, and the isocyanurate of isophorone diisocyanate, available from Huils under the trade designation Vestanat® T1890. Furthermore, (co)polymers of isocyanate-functional monomers such as α,α'-dimethyl-m-isopropenyl benzyl isocyanate are suitable for use. Finally, the above-mentioned isocyanates and adducts thereof may be present in the form of blocked isocyanates, as is known to the skilled man.

Preferred are the isocyanurate of hexamethylene diisocyanate, the biuret of hexamethylene diisocyanate, the isocyanurate of isophorone diisocyanate, mixtures of biuret of hexamethylene diisocyanate and isocyanurate of isophorone diisocyanate, and mixtures of isocyanurate of hexamethylene diisocyanate and isocyanurate of isophorone diisocyanate.

The polyisocyanate compound is used in an amount such that the ratio of isocyanate groups to the total number of hydroxy groups in the filler composition is in the range of 0.5 to 2 and, preferably, 0.75 to 1.25.

Pigments are present in the filler composition of the present invention. Useful pigments are various types common to the art which include but are not limited to titanium dioxide, graphite, carbon black, zinc oxide, calcium sulphide, chromium oxide, zinc sulphide, zinc chromate, strontium chromate, barium chromate, lead chromate, lead cyanamide, lead silico chromate, yellow nickel titanium, yellow chromium titanium, red iron oxide, yellow iron oxide, black iron oxide, naphtol red and browns, anthraquinones, dioxa zinc violet, isoindoline yellow, arylide yellow and oranges, ultramarine blue, phthalocyanine complexes, amaranth, quinacridones, halogenated thioindigo pigments, extender pigments such as magnesium silicate, aluminium silicate, calcium silicate, calcium carbonate, fumed silica, barium sulphate, and zinc phosphate, and mixtures thereof. Preferably, magnesium silicate, aluminium silicate, barium sulphate, calcium carbonate, titanium dioxide, zinc phosphate, preferably micronised, and mixtures thereof are used. The pigment volume concentration in the filler composition ranges from 40 to 80%, preferably from 40 to 60%, on solids.

The filler composition can also comprise catalysts for the isocyanate-hydroxy reaction, such as dibutyl tin dilaurate, dimethyl tin dilaurate, dioctyl tin dilaurate diazabicyclooctane (DABCO), zirconium octoate, triethyl amine, and mixtures thereof. Preferably, a mixture of dibutyl tin dilaurate and zirconium octoate is used. The catalyst is used in an amount of 0.001 to 5 wt. % on solid resin, preferably 0.1 to 2.5 wt. %. The mixing ratio of dibutyl tin dilaurate and zirconium octoate may range between 1:5–100, preferably 1:15–75.

The composition can further comprise conventional polymers such as a polyester resin, an epoxy resin, optionally hydroxy-functional, and mixtures thereof. Also adhesion promoters such as amino, mercapto, and epoxy silanes and elasticity promoters such as Elast-o-Actif™, ex Akzo Nobel Coatings BV, Netherlands, may be included.

Preferably, nitro-cellulose may be added to the filler composition to enhance build. Nitro-cellulose may be used in an amount of 0.01 to 5 wt. % on the filler composition.

The composition can further comprise conventional additives, such as stabilisers, surfactants, UV-absorbers, catalyst blockers, anti-oxidants, pigment dispersants, flow additives, rheology control agents, levelling agents, and solvents. The solvent can be any solvent known in the art., i.e. aliphatic and/or aromatic hydrocarbons. Examples include Solvessoo 100, toluene, xylene, butanol, isopropanol, butyl acetate, ethyl acetate, methoxypropyl acetate, acetone, acetyl acetone, methyl isobutyl ketone, methyl isoamyl ketone, methyl ethyl ketone, methoxy propanal, diacetone alcohol, butyl glycol acetate, ethyl ethoxy propionate, tetrahydronaphthalene, and mixtures thereof.

Preferably, the filler composition comprises less than 600 g/l of volatile organic solvent based on the total composition, more preferably less than 550 g/l, most preferably less than 525 g/l, measured in accordance with to ISO 11890.

The filler compositions are formulated in a 1-, 2- or 3-component system, depending on the choice of free isocyanate or blocked isocyanate groups and the presence of catalysts in the system.

The filler composition of the present invention is used in the preparation of coated substrates. These substrates include wood, plastic, and metal. The substrate may be precoated with a primer prior to application of the filler composition. The filler composition is especially useful in the refinish industry, in particular the body shop, to repair automobiles. The filler composition is also applicable in the automotive industry for the finishing of large transport vehicles, such as trains and buses, and can also be used on airplanes. The filler composition can be applied using conventional spray equipment or high-volume low-pressure spray equipment, resulting in a high-quality finish. Other modes of application are roller coating, brushing, sprinkling, flow coating, dipping, electrostatic spraying or electrophoresis, spraying being preferred. Exemplary metal substrates include steel, galvanised steel, aluminium, copper, zinc, magnesium, and alloys thereof. Curing temperatures are preferably between 0 and 80° C., and more preferably between 20 and 60° C. Curing can also be carried out under IR light.

It is a further advantage of the filler compositions of the present invention that they can provide layers of 25 to 250μ without any problem. The mentioned thickness refers to the dry film thickness. These layer thickness can be achieved without sagging and blisters.

The invention is further illustrated by the following examples.

EXAMPLES

The following methods were used unless otherwise indicated:

The viscosity is measured in a DIN flow cup number 4 in accordance with DIN 53221-1987 (DinC 4). The viscosity is given in seconds.

The pot life is the time between the initial mixing of all components and the point where the viscosity has increased to 2 times the initial viscosity.

The VOC of the filler composition is measured in accordance with ISO 11890.

The Persoz hardness is measured in accordance with ISO 1522-1973, except that a steel plate, treated as indicated in the examples, is used instead of a glass plate.

Adhesion is measured in accordance with ISO 2409. The adhesion is determined visually on a scale from 0 (=no detachment) to 5 (=total detachment).

Elasticity is measured in accordance with ISO 1520 (Erichsen) and in accordance with ASTM D2974 (impact).

Stone chip resistance is measured in accordance with Ford BI 157-04. The panels are evaluated visually on a scale from 0 (=good) to 7 (=bad). A first test was carried out on a non-treated panel. A second test on the same place on the panel was carried out after 72 hours soaking in water in accordance with ASTM D870.

Water resistance is measured in accordance with ASTM D4585 (condense test QTC 40° C.).

The corrosion resistance was measured in accordance with ASTM B117 (salt spray test).

The following compounds were used:

Hydroxy group-containing polyacrylate A with the following monomer composition: 53 wt. % styrene, 28 wt. % hydroxy ethyl methacrylate, 18 wt. % butyl acrylate, and 1 wt. % acrylic acid. Mw=21,000 (GPC with polystyrene as standard); hydroxy value=120 mg KOH/g solid resin, acid value=8 mg KOH/g solid resin, Tg=47° C., and solids content=52 wt. % in xylene.

Hydroxy group-containing polyacrylate B prepared according to Copolymer 1 disclosed in DE 35 46 594 and GB 2 186 281 with the following monomer composition: 30 wt. % styrene, 18.4 wt. % methyl methacrylate, 30 wt. % hydroxy ethyl methacrylate, 20.3 wt. % butyl acrylate, and 1.3 wt. % acrylic acid. Mw=6750 (GPC with polystyrene as standard); hydroxy value=120 mg KOH/g solid resin, s.c. is 71 wt. %.

Hydroxy group-containing polyacrylate C with the following monomer composition: 30 wt. % styrene, 18.4 wt. % methyl methacrylate, 30 wt. % hydroxy ethyl methacrylate, 20.3 wt. % butyl acrylate, and 1.3 wt. % acrylic acid. Mw=33400 (GPC with polystyrene as standard); hydroxy value=120 mg KOH/g solid resin, s.c. is 62 wt. %.

Hydroxy group-containing polyacrylate D prepared according to Copolymer 7 disclosed in DE 35 46 594 and GB 2 186 281 with the following monomer composition: 50.5 wt. % styrene, 17.6 wt. % methyl methacrylate, 15 wt. % hydroxy ethyl acrylate, 15.2 wt. % 2-ethyl hexyl acrylate, and 1.8 wt. % acrylic acid. Mw=28 900 (GPC with polystyrene as standard); hydroxy value=80 mg KOH/g solid resin, s.c. is 51 wt. %.

DBTL is dibutyl tin dilaurate, 1 wt. % in xylene.

Durham Zirconium 18 is 63 wt. % zirconium octoate in Exxsol D60.

NCO-X: isocyanurate of hexamethylene diisocyanate,

NCO-Y: 4:1 weight mixture of biuret of hexamethylene diisocyanate and isocyanurate of isophorone diisocyanate NCO-Z: 5:1 weight mixture of isocyanurate of hexamethylene diisocyanate and isocyanurate of isophorone diisocyanate

Examples 1 to 24

The filler composition is prepared from the following compounds, except for the polyisocyanate and DBTL:

| | |
|---|---|
| 27.6 g | hydroxy group-containing polyacrylate A |
| 14.8 g | titanium dioxide |
| 10 g | micronised zinc phosphate |
| 10 g | calcium carbonate |
| 21.8 g | aluminium silicate |
| 14 g | butyl acetate and methoxypropyl acetate |
| 1.25 g | conventional additives |
| 0.5 g | Durham Zirconium 18 |

TABLE 1

Filler compositions

| | Hardener | Amount DBTL (g) | Ratio Zr:Sn | DinC 4 (sec) | NCO:OH crosslinking ratio | VOC (g/l) |
|---|---|---|---|---|---|---|
| A | Sanding | NCO-Y | 0.9 | 35:1 | 20 | 0.8 | 527 |
| B | Sanding | NCO-X | 1.1 | 30:1 | 20.8 | 1 | 522 |
| C | Sanding | NCO-Z | 1.5 | 20:1 | 19.2 | 0.9 | 507 |
| D | Non-sanding | NCO-X | 0.5 | 64:1 | 14.2 | 1.15 | <540 |

Substrate

Steel: A steel panel was degreased with M600 Degreaser (commercially available from Akzo Nobel Coatings BV, Netherlands) and sanded by machine with P180.

Aluminium: An aluminium panel was degreased with M600 Degreaser and scuffed with a red Scotch Brite pad type A.

Galvanised steel: A galvanised steel panel was degreased with M600 Degreaser and scuffed with a red Scotch Brite pad type A. Then the panel was degreased again with M600.

Precoat

The panels were treated with Washprimer CR, ex Akzo Nobel Coatings BV, Netherlands, prior to the application of the filler.

Top Coats
B/C=Base/Clear
  Autobase (commercially available from Akzo Nobel Coatings)
  Autoclear MS 2000 (commercially available from Akzo Nobel Coatings)
Solid Colours
  AC: Autocryl (commercially available from Akzo Nobel Coatings)
  AC+: Autocryl Plus (commercially available from Akzo Nobel Coatings)
  AC LV: Autocryl LV 480 (commercially available from Akzo Nobel Coatings)
Sanding Fillers The precoated substrates were sprayed with the sanding fillers and dried for 1 day at room temperature. Then the coated substrates were sanded with P500 and coated with the different top coats. The dried layer thickness of the filler was 70 to 100μ.

Sanding was possible after 3 hours drying at room temperature, 30 minutes drying at 60° C., 16 hours drying at 10° C., or 15 minutes drying under IR light. Accordingly, the drying time is excellent of the sanding fillers.

Non-sanding Fillers

The precoated substrates were sprayed with the non-sanding fillers and coated directly with the different top coats (wet-on-wet). The estimated dried layer thickness of the filler was 35 to 50μ.

Pot life of both sanding and non-sanding fillers was 60 to 120 minutes. The balance between pot life and drying/sandability properties was excellent as well as the build versus drying time. Flow properties were excellent, especially for the sanding filler which resulted in less sanding. The enamel hold out was good.

The results of the system properties are summarised below in Tables 2 and 3.

TABLE 2

Properties sanding and non-sanding filler on steel with precoat

| Ex. | Filler | Top coat | Persoz hardness (kg/mm²) | Gitterschnitt 2 mm | Erichsen (mm) | Impact (kg/cm) | Stone chip 157-04 | Condense test QCT 40° C. Blistering 1 day | 10 days | Salt spray Loss of adhesion (mm) 1 day | 10 days |
|---|---|---|---|---|---|---|---|---|---|---|---|
| 1 | A | AC    | 164 | GT 1   | 4.3 | 32.5  | 2–3/4–5 | 8F   | 8F   | <½ | <½ |
| 2 | A | B/C   | 145 | GT 1   | 9.1 | >100  | 3–4/4–5 | 8F   | 8F   | <½ | <½ |
| 3 | B | AC+   | 181 | GT 1   | 4.8 | 27.5  | 2–3/4   | 8F   | 8F   | <½ | <½ |
| 4 | B | B/C   | 155 | GT 1   | 9.1 | 82.5  | 2–3/5   | 8F   | 7M   | <½ | <½ |
| 5 | C | AC LV | 168 | GT 1   | 5.4 | 25.0  | 2–3/4   | 8F   | 8F   | <½ | <½ |
| 6 | C | B/C   | 174 | GT 0   | 8.3 | 87.5  | 3/6–7   | 8F   | 8–9F | <½ | <½ |
| 7 | D | AC LV | 210 | GT 1   | 5.9 | 32.5  | 3/4     | 8F   | 8F   | <½ | <½ |
| 8 | D | B/C   | 175 | GT 2–3 | 8.0 | 62.5  | 3–4/4–5 | 8F   | 5F/M | <½ | <½ |

The sanding and non-sanding fillers of the present invention provide excellent hardness, elasticity, adhesion, water and corrosion resistance irrespective of the used hardeners.

TABLE 3

Properties sanding and non-sanding filler on galvanised steel and aluminum with precoat

| No. | Filler | Top coat | Substrate | Gitterschnitt 2 mm | Stone chip 157-04 | Condense test QCT 40° C. Blistering 1 day | 10 days | Salt spray Loss of adhesion (mm) 1 day | 10 days |
|---|---|---|---|---|---|---|---|---|---|
| 9  | A | AC    | Galvanised | GT 1 | 2–3/4–5 | 8F   | 8MD | <½ | ½–1½ |
| 10 | A | B/C   | Galvanised | GT 1 | 3/4–5   | 8F   | 8F  | <½ | <½ |
| 11 | B | AC+   | Galvanised | GT 1 | 2–3/4   | 8F   | 8F  | <½ | ½–1½ |
| 12 | B | B/C   | Galvanised | GT 0 | 2–3/4–5 | 8F   | 8F  | <½ | <½ |
| 13 | C | AC LV | Galvanised | GT 1 | 2–3/4–5 | 8F   | 8F  | <½ | ½–½ |
| 14 | C | B/C   | Galvanised | GT 2 | 2–3/4–5 | 8F   | 8F  | <½ | <½ |
| 15 | D | AC LV | Galvanised | GT 2 | 3/3–4   | 8F   | 8F  | <½ | 1–1½ |
| 16 | D | B/C   | Galvanised | GT 2 | 3–4/5   | 8F/M | 6–7M| <½ | <½ |
| 17 | A | AC    | Aluminium  | GT 0 | 2/4     | 8F   | 8F  | <½ | <½ |
| 18 | A | B/C   | Aluminium  | GT 0 | 2–3/5   | 8F   | 8F  | <½ | <½ |
| 19 | B | AC+   | Aluminium  | GT 0 | 2/4     | 8F   | 8F  | <½ | <½ |
| 20 | B | B/C   | Aluminium  | GT 0 | 2/4–5   | 8F   | 8F  | <½ | <½ |
| 21 | C | AC LV | Aluminium  | GT 0 | 2/4     | 8F   | 8F  | <½ | <½ |
| 22 | C | B/C   | Aluminium  | GT 1 | 2–3/4–5 | 8F   | 8F  | <½ | <½ |
| 23 | D | AC LV | Aluminium  | GT 0 | 2–3/3   | 8F   | 8F  | <½ | <½ |
| 24 | D | B/C   | Aluminium  | GT 2 | 3/4–5   | 8F   | 6F  | <½ | <½ |

Again, the system properties of the panels coated with sanding and non-sanding fillers are excellent.

Example 25 and Comparative Examples A and B

The following filler composition was prepared:

| | |
|---|---|
| 27.6 g | hydroxy group-containing polyacrylate C (s.c. brought to 51% with the addition of butyl acetate) |
| 14.8 g | titanium dioxide |
| 10 g | micronised zinc phosphate |
| 10 g | calcium carbonate |
| 21.8 g | aluminium silicate |
| 14 g | butyl acetate and methoxypropyl acetate |
| 1.25 g | conventional additives |
| 0.5 g | Durham Zirconium 18 |
| 0.5 g | DBTL |

NCO-X was added to obtain a NCO: OH ratio of 1. This filler composition was applied on a steel panel. Sanding properties and MEK resistance were determined after 3 hours drying at ambient temperature. The experiment was repeated except for the substitution of hydroxy group-containing polyacrylate B or D for hydroxy group-containing polyacrylate C at a s.c. of 51 wt. %. The results of the experiments are compiled in Table 4.

TABLE 4

Properties of sanding fillers comprising different hydroxy group-containing polyacrylates

| Ex. | Resin | Mw | OH value | Sandability with P400 | MEK resistance | Hardness |
|---|---|---|---|---|---|---|
| A | B | 6,750 | 120 | 4 | 4 | 5 |
| 25 | C | 33,400 | 120 | 9 | 9 | 9 |
| B | D | 28,900 | 80 | 6 | 5 | 5 |

Rating: 0=worst, 10=best

Sandability: judged as clogging of the sanding paper, i.e. formation of hard shiny lumps that stick to the sanding paper.

MEK resistance: a piece of cottonwool, soaked with methyl ethyl ketone is placed on the coating for 1 minute; after removal of the cottonwool the hardness is judged by fingernail.

Hardness: judged by fingernail.

As can be seen from the results in Table 4, a filler composition according to the invention provides better results than a filler composition according to the prior art.

What is claimed is:

1. Filler composition comprising
   A) at least one hydroxy group-containing polyacrylate comprising
      40–70 wt. % aromatic vinyl monomers and/or methyl methacrylate,
      25–40 wt. % hydroxy-functional (meth)acrylic monomers,
      0–20 wt. % (meth)acrylic monomers having at least 2 carbon atoms in the alkyl group, and
      0.5–2.5 wt. % (meth)acrylic acid,
      wherein the hydroxy group-containing polyacrylate has a hydroxy value of between 100 and 160 mg KOH/g solid resin, an acid value between 5 and 20 mg KOH/g solid resin, a Mw higher than 15,000, and a Tg between 25 and 100° C.,
   B) at least one polyisocyanate compound, and
   C) at least one pigment,
   the filler composition having a pigment volume concentration ranging from 40 to 80% on solids.

2. Filler composition according to claim 1 comprising
   47–53 wt. % aromatic vinyl monomers and/or methyl methacrylate,
   28–33 wt. % hydroxy-functional (meth)acrylic monomers,
   14–19 wt. % (meth)acrylic monomers having at least 2 carbon atoms in the alkyl group, and
   0.5–2 wt. % (meth)acrylic acid.

3. Filler composition according to claim 1 wherein the hydroxy group-containing polyacrylate has a hydroxy value of between 110 and 130 mg KOH/g solid resin, a Mw of between 15,000 and 30,000, and a Tg between 40 and 60° C.

4. Filler composition according to claim 1 wherein the polyisocyanate is selected from the isocyanurate of hexamethylene diisocyanate, the biuret of hexamethylene diisocyanate, and the isocyanurate of isophorone diisocyanate, and mixtures thereof.

5. Filler composition according to claim 1 wherein the polyisocyanate compound is used in an amount such that the ratio of isocyanate groups to the total number of hydroxy groups in the filler composition is in the range of 0.75 to 1.25.

6. Filler composition according to claim 1 wherein the pigment is selected from magnesium silicate, aluminium silicate, barium sulphate, calcium carbonate, titanium dioxide, zinc phosphate, and mixtures thereof.

7. Filler composition according to claim 1 wherein the filler composition additionally comprises a catalyst for the isocyanate-hydroxy reaction selected from dibutyl tin dilaurate and zirconium octoate and mixtures thereof.

8. Filler composition according to claim 1 wherein the filler composition comprises a pigment volume concentration ranging from 40 to 60% on solids.

9. The method of using the filler composition according to claim 1 in the finishing of large vehicles.

10. The method of using the filler composition according to claim 1 in the refinishing of large vehicles and cars.

11. Filler composition according to claim 2 wherein the hydroxy group-containing polyacrylate has a hydroxy value of between 110 and 130 mg KOH/g solid resin, a Mw of between 15,000 and 30,000, and a Tg between 40 and 60° C.

12. Filler composition according to claim 2 wherein the polyisocyanate is selected from the isocyanurate of hexamethylene diisocyanate, the biuret of hexamethylene diisocyanate, and the isocyanurate of isophorone diisocyanate, and mixtures thereof.

13. Filler composition according to claim 2 wherein the polyisocyanate compound is used in an amount such that the ratio of isocyanate groups to the total number of hydroxy groups in the filler composition is in the range of 0.75 to 1.25.

14. Filler composition according to claim 2 wherein the pigment is selected from magnesium silicate, aluminium silicate, barium sulphate, calcium carbonate, titanium dioxide, zinc phosphate, and mixtures thereof.

15. Filler composition according to claim 2 wherein the filler composition additionally comprises a catalyst for the isocyanate-hydroxy reaction selected from dibutyl tin dilaurate and zirconium octoate and mixtures thereof.

16. Filler composition according to claim 2 wherein the filler composition comprises a pigment volume concentration ranging from 40 to 60% on solids.

17. The method of using the filler composition according to claim 2 in the finishing of large vehicles.

18. The method of using the filler composition according to claim 2 in the refinishing of large vehicles and cars.

* * * * *